W. J. BEAGLE.
LUBRICATOR.
APPLICATION FILED NOV. 6, 1920.
1,393,337.
Patented Oct. 11, 1921.
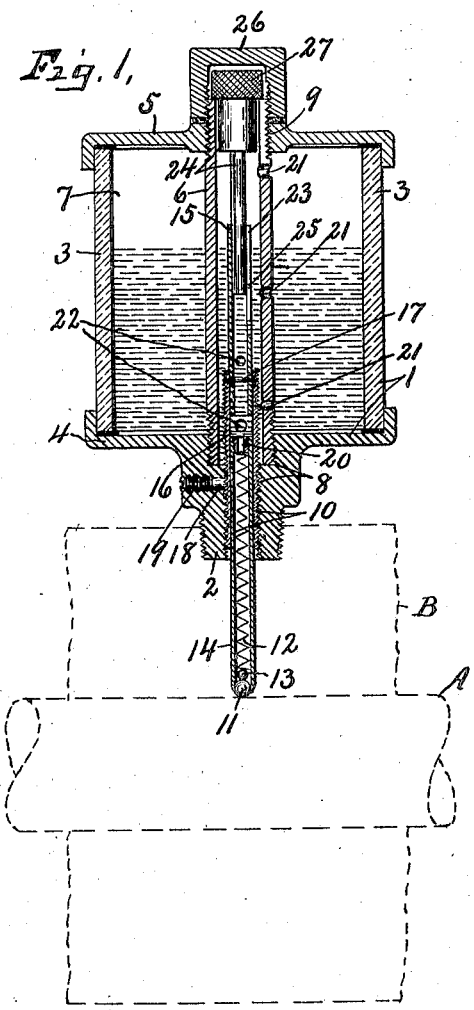
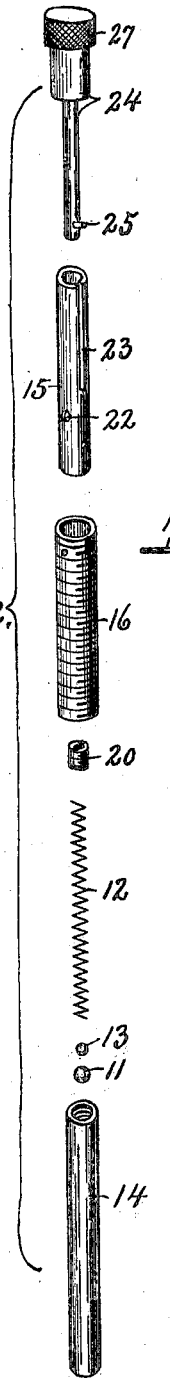

UNITED STATES PATENT OFFICE.

WILLIAM J. BEAGLE, OF SYRACUSE, NEW YORK, ASSIGNOR OF ONE-HALF TO JOHN M. STEVER, OF SYRACUSE, NEW YORK.

LUBRICATOR.

1,393,337.  Specification of Letters Patent.  Patented Oct. 11, 1921.

Application filed November 6, 1920. Serial No. 422,197.

*To all whom it may concern:*

Be it known that I, WILLIAM J. BEAGLE, of Syracuse, New York, in the county of Onondaga, in the State of New York, have invented new and useful Improvements in Lubricators, of which the following, taken in connection with the accompanying drawings, is a full, clear, and exact description.

This invention relates to certain improvements in lubricators of the class set forth in my pending application, Serial No. 353,273, filed January 22, 1920, in which an oil-container is provided with means for securement to one of the parts to be lubricated, and is also provided with a feed tube leading from the container to the other part to be lubricated, and containing a roller spring pressed into contact with the second named part for rolling contact therewith to distribute the oil evenly over and upon the surface thereof.

In the pending application referred to, as in the present application, the main object is to enable the oil feeding tube with the roller and spring therein to be adjusted axially for bringing the roller into rolling contact with one of the parts to be lubricated without detaching the oil container from the part to which it is secured.

One of the specific objects of my present invention is to make the tube-adjusting means a part of the lubricating device, or rather to incorporate it therein in such manner that it is always available for operation to adjust the tube without disturbing the container from its operative position.

Another object is to provide means for covering and concealing the tube-adjusting means when the tube has been properly adjusted. Other objects and uses will be brought out in the following description.

In the drawings, Figure 1 is a longitudinal sectional view of a lubricating device embodying the various features of my invention, the parts to be lubricated being shown by dotted lines.

Fig. 2 shows perspective views of the detached parts of the oil feeding tube and its adjusting means.

In order that my invention may be clearly understood, I have shown relatively rotatable parts —A— and —B—, mounted one upon the other, and an oil-container —1— having a threaded nipple —2— for securement to one of said parts, as —B—, so as to extend radially therefrom.

This oil-container comprises a cylindrical shell —3— preferably of glass or other transparent material, and inner and outer end heads —4— and —5— which are secured upon the adjacent ends of a central connecting-tube —6— and are engaged with the corresponding ends of the shell —3— to form the oil chamber —7—.

The heads —4— and —5— are provided with central lengthwise openings —8— and —9— therethrough for the exit and entrance of oil and for other purposes hereinafter described, the walls of said openings being threaded for receiving the externally threaded adjacent ends of the connecting-tube —6—. The inner end of the inner opening —8— is reduced in diameter but is threaded to receive an externally threaded oil feeding-tube —10—, which is adjustable endwise or axially by rotation toward and from the bearing between the relatively rotatable parts —A— and —B—.

A ball or roller —11— is seated in the inner end of the oil feeding-tube —10— for rolling contact with the periphery of the part —A— and is yieldingly held in engagement with said part by means of a coil spring —12— within the tube —10—.

A relatively smaller ball —13— is interposed between the contact ball —11— and the adjacent end of the spring —12— to reduce friction and thereby permit the ball —11— to be rotated more freely by contact with the part —A—, as the parts —A— and —B— are relatively rotated, thereby effecting an even distribution of the oil over and upon the bearing between those parts without waste.

The oil feeding-tube —10— is preferably composed of an inner section —14—, an outer section —15— and an intermediate section —16—, the sections —12— and —15— being preferably made of thin, steel tubing and are arranged coaxially in spaced relation end to end and connected by the intermediate tube —16—, which is preferably made of brass tubing and is threaded externally to engage the reduced threaded part of the opening —8—, said intermediate section —16— being permanently secured by a tight fit to the section —14— and is also secured by a cotter key or pin —17— to the inner end of the section —15—, whereby the rotation of the outer section —15— will impart similar turning movement to the sections —14— and —16— for adjusting the tube —10— axially to bring the ball or roller —11— to proper contact with the periphery of the part —A— for rolling movement, it being understood that the section —14— extends inwardly some distance beyond the inner end of the nipple —2—, when the lubricator is adjusted for use. The tube —10—, as a whole, is held in its adjusted position by a clamping block —18— and a set screw —19—, both of which are movable in a radial opening in the nipple —2—, as shown in Fig. 1, the inner end of the clamping block —8— being serrated to engage the thread of the intermediate section —16— and thereby to prevent mutilation of the threads.

An externally threaded tubular bushing —20— is screwed in the outer end of the section —14— for adjusting the tension of the spring —12— upon the ball —11—, said spring serving to hold the ball in contact with the periphery of the part —A—.

The connecting-tube —6— communicates with the oil chamber —7— through radial passages —21— to allow the oil to flow from said chamber to the interior of the tube and, thence, through one or more openings —22— into the interior of the feeding-tube —10—, through which it flows to the bearing between the parts —A— and —B—.

The outer section —15— of the oil feeding-tube extends through the major portion of the connecting-tube —6— or to a point within a relatively short distance of the outer head —5—, and is provided with a lengthwise slot —23— in one side for coöperation with a suitable turning member —24—, which extends some distance into the outer end of the section —15—, and is provided near its inner end with a radially projecting pin or stud —25— projecting into the slot —23— for turning the tube —10—, as member —24— is rotated.

The outer threaded end of the connecting tube —6— extends through and beyond the outer end head —5— and is engaged by a screw cap —26— which constitutes a closure for the adjacent open end of the tube and also for the opening —9—.

The outer end of the member —24— is enlarged and provided with a knurled head —27— resting upon the outer end of the connecting tube —6— to hold it against inward axial movement and to permit it to be always accessible for engagement by hand in turning the feeding-tube —10— to properly adjust the ball —11— against the periphery of the part —A—, when the oil cup is adjusted for use and the cap —26— removed.

That is, by extending the head —27— of the adjusting member —24— outwardly beyond the head —5— and connecting-tube —6—, enables the feeding-tube —10— with the ball —11— and spring —12— therein to be adjusted to a nicety after the lubricator is installed and without displacing any of its parts other than the loosening of the set screw —19— and removal of the cap —26—, both of which are accessible at all times. After the adjustment is made, the set screw —19— may be tightened and the cap —26— replaced to cover the outer end of the adjusting member —24— and opening —9—, the entire device being then ready for use.

What I claim is:

1. A lubricator comprising an oil-container having inner and outer end heads provided with coaxial openings therethrough, the inner head having means for securement to one of the parts to be lubricated, a tube movable endwise in the inner opening for feeding oil from said container to another part to be lubricated, a roller in the inner end of said tube for rolling contact with the second named part, a spring for yieldingly holding the roller in contact with said second named part, means extending through the outer opening for adjusting said tube endwise, and a movable closure for the outer opening normally covering the outer end of the tube-adjusting means.

2. A lubricator comprising an oil-container having inner and outer end heads provided with coaxial openings therethrough, the inner head having means for securement to one of the parts to be lubricated, a tube having screw engagement with the walls of the inner opening for endwise adjustment by turning, a ball in the inner end of the tube spring pressed toward the other part to be lubricated, a rotary member in the outer opening, means for transmitting rotary motion from said member to the tube, and means for holding said member against inward movement, when rotated to adjust the tube.

3. In a lubricator of the character described, the combination of a container having its inner and outer end heads provided with openings therethrough, the inner head having means for attachment to one of the parts to be lubricated, a tubular member extending into said openings and connecting said heads, an oil feeding-tube adjustable endwise in the inner opening and extending to a point in proximity to the bearing to be lubricated, said oil feeding-tube also extending outwardly into the tube which connects the heads, means movable in the outer end of the head-connecting tube and engaged with the outer end of the oil-feeding-tube for adjusting the latter axially, and a screw cap engaging the outer end of the head-connecting tube and normally covering the outer end of the adjusting means for the oil-feeding-tube.

In witness whereof I have hereunto set my hand this 26 day of October, 1920.

WILLIAM J. BEAGLE.

Witnesses:
E. M. FRADENBURGH,
H. E. CHASE.